US007471289B2

(12) United States Patent
Takaki

(10) Patent No.: US 7,471,289 B2
(45) Date of Patent: Dec. 30, 2008

(54) IMAGE DISPLAY APPARATUS, TIMING CONTROLLER FOR DRIVER IC, AND SOURCE DRIVER IC

(75) Inventor: Jiro Takaki, Kumamoto (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 612 days.

(21) Appl. No.: 11/136,532

(22) Filed: May 25, 2005

(65) Prior Publication Data

US 2005/0264511 A1 Dec. 1, 2005

(30) Foreign Application Priority Data

May 31, 2004 (JP) ............................ 2004-161243

(51) Int. Cl.
*G06F 3/038* (2006.01)

(52) U.S. Cl. ...................................... 345/213; 345/204

(58) Field of Classification Search ........... 345/87-100, 345/1.2, 204, 213; 370/428
See application file for complete search history.

(56) References Cited

U.S. PATENT DOCUMENTS

| | | | | |
|---|---|---|---|---|
| 5,319,395 | A * | 6/1994 | Larky et al. | 345/605 |
| 2001/0013843 | A1* | 8/2001 | Fujiwara et al. | 345/1.2 |
| 2004/0008714 | A1* | 1/2004 | Jones | 370/428 |
| 2004/0090435 | A1* | 5/2004 | Kim | 345/204 |
| 2005/0088432 | A1* | 4/2005 | Miyazawa et al. | 345/204 |

FOREIGN PATENT DOCUMENTS

| | | |
|---|---|---|
| JP | 2001-242817 A1 | 9/2001 |
| JP | 2002-055646 | 2/2002 |
| JP | 2002-062840 | 2/2002 |
| JP | 2002-091367 | 3/2002 |
| JP | 2002-111249 A1 | 4/2002 |

OTHER PUBLICATIONS

Japanese Office Action dated Jun. 2, 2008, with English-Language Translation.

* cited by examiner

*Primary Examiner*—Nitin Patel
(74) *Attorney, Agent, or Firm*—Buchanan Ingersoll & Rooney PC

(57) ABSTRACT

An image display apparatus includes a timing controller to generate a control signal according to image data, a driver IC to take in image data according to the control signal and to supply the image data to source lines, and a display panel to perform screen-displaying according to the image data supplied to the source lines. Plural input ports of the driver IC, from which the image data are inputted, are arranged asymmetrically with respect to an input port for the control signal. The timing controller includes plural data output ports to output image data to the driver IC, an arrangement information storing unit to store arrangement information defining normal and reverse orders of arrangement of the image data, and an output port switching unit to determine an order of arrangement of the image data according to the arrangement information and to supply the image data.

9 Claims, 10 Drawing Sheets

IMAGE DISPLAY APPARATUS, TIMING CONTROLLER FOR DRIVER IC, AND SOURCE DRIVER IC

BACKGROUND OF THE INVENTION

1. Field of the Invention

The present invention relates to an image display apparatus, to a timing controller for a driver IC, and to a source driver IC. More particularly, the invention relates to improvement of an image display apparatus, such as a liquid crystal display, having a timing controller to generate a control signal, a driver IC to take in image data and to supply the image data to a source line, and a display panel for screen-displaying the image data supplied to the source line.

2. Description of the Related Art

An image display apparatus, such as a liquid crystal display, causes a source driver IC to take in image data according to operating clocks and supply the image data to each of source lines thereby to perform screen-displaying. Control signals, such as an operating clock, and image data are supplied from a timing controller. In such an image display apparatus, sometimes, the wiring between the timing controller and the source driver IC is shortcircuited according to the position, at which each of the timing controller and the source driver IC is mounted, and to the assignment of image data to each of data input ports of the source driver IC. Thus, through holes for electrically connecting a surface layer wiring to a lower layer wiring are provided in a board so as to prevent the wiring from being shortcircuited.

FIG. 7 is a schematic view showing the configuration of an image display apparatus. This figure shows a liquid crystal module 100 including a substrate 101, on which a display panel 102, a source driver IC 103, and a gate driver IC 104 are provided, and also including a board 107 on which a timing controller 108 is provided. The display panel 102 is a liquid crystal panel to perform screen-displaying according to image data supplied to signal lines (or source lines) 105. The source lines 105 and the gate lines 106 are formed in a matrix-like configuration thereon. Plural source driver ICs 103 are provided along one side of the display panel 102 on the substrate 101, and plural gate driver ICs 104 are provided along an adjacent side of the display panel 102 thereon.

The timing controller 108 outputs control signals, such as an operating clock for horizontal scanning, and a horizontal synchronization start pulse, to each of the source driver ICs 103, and also outputs control signals, such as an operating clock for vertical scanning, and a vertical synchronization start pulse, to each of the gate driver ICs 104.

FIG. 8 is a view illustrating the details of a primary part of a conventional image display apparatus and shows the manner of a wiring between the timing controller 108 and each of the source driver ICs 103. Each of the source driver ICs 103 is provided with plural data input ports to take in image data, and with a clock port to which operating clocks are inputted. Surface layer wirings extend from teach of the data input ports and the clock port. Among the source driver ICs 103, associated data input ports and associated clock ports are electrically connected to one another through the through hole and the lower layer wiring so as to prevent the wirings from being shortcircuited.

Incidentally, the image data and the operating clocks are assumed to be transmitted from a CMOS (Complementary Metal Oxide Semiconductor) gate by a single-end transmission. Two groups of the data input ports are disposed in such a way as to be symmetrical with respect to the clock port. That is, the group of the data input ports, to which image data EVEN000R to EVEN023B are inputted, and that of the data input ports, to which image data ODD000R to ODD023B are inputted, are disposed on either side of the clock port CLK.

The timing controller 108 is provided with plural data output ports to output image data, and with a clock port to output operating clocks. Surface layer wirings extend from each of the data output ports and this clock port. In a case where the order of arrangement of the ports of the timing controller 108, which respectively associated with the image data EVEN000R to EVEN023B and ODD000R to ODD023B, is the same as that of arrangement of the ports of each source driver IC 103, which are respectively associated with such image data, and where the timing controller 108 is disposed in such a way as to be opposed to each of the source drive ICs 103, the surface layer wirings drawn from the timing controller 108 toward the source driver ICs 103 intersect with one another on the surface layer and are shortcircuited. Thus, through holes are newly provided in the board, and the associated ones of the lower layer wirings are connected to each other.

Consequently, even in the case where the timing controller 108 having the ports, the order of arrangement of which are respectively associated with the image data EVEN000R to EVEN023B and ODD000R to ODD023B and is the same as that of arrangement of the ports of each source driver IC 103, which are respectively associated with such image data, and where the timing controller 108 is disposed in such a way as to be opposed to the source drive IC 103, the timing controller 108 can be connected to the source drive IC 103 without shortcircuiting. However, because of the increase in the number of through holes, it is necessary for preventing occurrence of shortcircuiting to increase wiring spacing. Thus, such a conventional image display apparatus has the problems that the area of the circuit board increases, and that the multilayering thereof occurs. Further, when the number of through holes in a transmission path increases, the number of points of discontinuity in the characteristic impedance of the transmission path increases. Consequently, the conventional image display apparatus has the problem that the quality of waveform of a signal is deteriorated during the transmission of image data.

Thus, to properly connect the timing controller to the source driver IC without newly providing through holes therein, it is considered that the order of arrangement of image data outputted from the data output ports of the timing controller is inverted as need arises.

FIG. 9 is a view illustrating the details of a primary part of a conventional image display apparatus and shows the manner of wiring between a timing controller 110 and the source driver IC by inverting the order of arrangement of image data to thereby supply the data to the data output ports. This timing controller 110 can invert the order of arrangement of image data and output such image data to the data output ports. Therefore, the inversion of the order of arrangement of the image data enables the appropriate connection between each port of the timing controller 110 and an associated port of the source driver IC 103 through the use of the surface layer wiring without newly providing through holes even in the case where the timing controller 110 is disposed in such a way as to be opposed to the source drive IC 103. However, the image display apparatus has the problem that in a case where the groups of the data input ports are arranged in such a manner as to be asymmetrical with respect to the clock port, even when the order of arrangement of the image data is inverted, the associated ports cannot properly be connected to each other unless through holes are newly provided therein.

In a case where the image data and the operating clock are transmitted in the form of differential signals by using RSDS (Reduced Swing Differential Signaling), usually, the arrangement of image data taken in from the data input ports of the source driver IC are asymmetrical with respect to the clock port. In such a case, even when the image data are supplied to the data output ports by inverting the order of the arrangement of the image data in the timing controller, the clock port of the timing controller cannot appropriately be connected to the clock port of the source driver IC unless through holes are newly provided, because the arrangement of the groups of data output ports are not symmetrical with respect to the clock port.

FIG. 10 is a view illustrating the details of a primary part of a conventional image display apparatus and shows the manner of wiring between a timing controller 121 and each of source driver ICs 120 so that the arrangement of image data taken in from data input ports is asymmetrical with respect to the clock port. Two groups of the data input ports are provided in each source driven IC 120 in such a way as to be asymmetrical with respect to the clock port. That is, the group of the data input ports, to which image data D000N to D003P are inputted, and the group of the data input ports, to which image data D010N to D013P and D020N to D023P are inputted, are disposed on either side of a group of clock ports CLKN and CLKP.

The order of arrangement of the ports of the timing controller 121 is the same as that of arrangement of the ports of each of the source driver ICs 120. The timing controller 121 is placed by being opposed to the source driver IC 120. Further, the ports of the timing controller 121 are connected to those of the source driver IC 120 by newly providing through holes and by using the lower layer wirings. In such an image display apparatus, even when the order of arrangement of image data outputted from the data output ports of the timing controller 121 is inverted so as to reduce the number of through holes, the associated clock ports cannot be connected to each other unless through holes are provided, because the arrangement of the groups of the data output ports are not symmetrical with respect to the group of the clock ports. (See JP-A-2002-91367.)

As described above, the conventional image display apparatus has the problem that in the case where the timing controller is connected to the source driver IC without shortcircuiting the wirings, the area of the circuit board increases, and the multilayering thereof occurs. Particularly, the conventional image display apparatus has the problems that the number of points of discontinuity in the characteristic impedance of the transmission path increases, and that the quality of waveform of a signal is deteriorated.

Also, the conventional image display apparatus has the problem that in a case where the groups of the data input ports are disposed in each of the source driver ICs in such a way as to be asymmetrical with respect to the clock port, the associated ports of the timing controller and the source driver IC cannot appropriately be connected to each other unless through holes are newly provided, even when the image data are supplied to the data output ports by inverting the order of arrangement of the image data of each group is inverted in the timing controller.

SUMMARY OF THE INVENTION

The invention is accomplished in view of the aforementioned circumstances. Accordingly, the invention provides an image display apparatus, which is enabled to suppress increase in the area and the multilayering of circuit boards and to improve the quality of waveform of a signal representing image data, and also to provide a timing controller for a driver IC therefor, and to provide a source driver IC therefor. Especially, an object of the invention is to provide a timing controller enabled to be connected to a source driver IC without newly providing a through hole in the board.

Also, the invention provides an image display apparatus enabled to appropriately connect associated ports of a timing controller and a source driver IC to each other without newly providing through holes therein even in a case where groups of data input ports are arranged in the source driver IC in such a way as to be asymmetrical with respect to a clock port.

According to an aspect of the invention, there is provided an image display apparatus image display apparatus having a timing controller to generate a control signal according to image data, a driver IC to take in image data according to the control signal and to supply the image data to source lines, and a display panel to perform screen-displaying according to the image data supplied to the source lines, wherein plural input ports of the driver IC, from which the image data are inputted, are arranged in such a way as to be asymmetrical with respect to an input port for the control signal. This image display apparatus features that the timing controller includes plural data output ports to output image data to the driver IC, an arrangement information storing unit to store arrangement information defining normal and reverse orders of arrangement of image data supplied to the data output ports, and an output port switching unit to determine an order of arrangement of the image data according to the arrangement information and to supply the image data to the data output ports.

With such a configuration, the order of arrangement of image data is determined according to the arrangement information. The image data is supplied to the data output ports. Thus, the order of arrangement of the image data outputted from the data output ports of the timing controller can be switched between the normal order and the reverse order as need arises. Consequently, the timing controller can be connected to the driver IC without newly providing through holes in the board.

The image display apparatus according to the invention may be configured so that the timing controller has two groups of clock ports from which an operating clock is outputted as an control signal, and that the groups of clock ports are respectively disposed at symmetrical positions in the arrangement of the data output ports. With such a configuration, the groups of clock ports are respectively disposed at symmetrical positions in the arrangement of the data output ports, so that the timing controller can be always and appropriately connected to the driver IC without newly providing through holes in the board. Especially, even in a case where groups of the data input ports are arranged in the driver IC in such a way as to be asymmetrical with respect to the clock port, for instance, in a case where the image data and the operating clock are transmitted in the form of differential signals by using RSDS (Reduced Swing Differential Signaling), the timing controller can appropriately be connected to the driver IC.

Further, according to another aspect of the invention, there is provided an image display apparatus having a timing controller to generate a control signal according to image data, a driver IC to take in image data according to the control signal and to supply the image data to source lines, and a display panel to perform screen-displaying according to the image data supplied to the source lines. In this image display apparatus, the driver IC includes plural data input ports to which image data are inputted from the timing controller, two groups of clock ports to which operating clocks are inputted, an arrangement information storing unit to store arrangement information determining which of a normal order and a reverse order is employed as an order of arrangement of image data taken in through the data input ports, and an input port switching unit to determine the order of arrangement according to the arrangement information and to take in image data. The groups of clock ports are respectively provided at symmetrical positions in an arrangement of the data input ports.

According to still another aspect of the invention, there is provided a timing controller for a driver IC, which generates an operating clock according to image data and outputs the operating clock to a driver IC to take in image data according to the operating clock. This timing controller includes plural data output ports to output image data to the driver IC, two groups of clock ports from each of which an operating clock is outputted, an arrangement information storing unit to store arrangement information defining normal and reverse orders of arrangement of image data supplied to the data output ports, and an output port switching unit to determine an order of arrangement of the image data according to the arrangement information and to supply the image data to the data output ports. The groups of clock ports are respectively provided at symmetrical positions in the arrangement of the data output ports.

According to yet another aspect of the invention, there is provided a source driver IC to take in image data according to an operating clock, which is generated by a timing controller according to image data. This source driver IC includes plural data input ports to which image data are inputted from the timing controller, two groups of clock ports to which operating clocks are inputted, an arrangement information storing unit to store arrangement information determining which of a normal order and a reverse order is employed as an order of arrangement of image data taken in through the data input ports, and an input port switching unit to determine the order of arrangement according to the arrangement information and to take in image data. The groups of clock ports are respectively provided at symmetrical positions in an arrangement of the data input ports.

In accordance with the image display apparatus, the timing controller for an driver IC, and the source driver IC according to the invention, the order of arrangement of image data outputted from the data output ports of the timing controller can be switch between the normal order and the reverse order, as need arises, by rewriting the arrangement information. Thus, the timing controller can be connected to the driver IC without newly providing through holes therein. Consequently, increase in the area of the circuit board and the multilayering thereof can be suppressed. Also, the quality of waveform of a signal representing the image data can be improved.

Especially, because the groups of clock ports are respectively provided at symmetrical positions in the arrangement of the data output ports, associated ports can be connected without newly through holes in the board between the timing controller and the driver IC even in a case where the data input ports of the driver IC are arranged in such a way as to be asymmetrical with respect to the clock port.

DETAILED DESCRIPTION OF THE INVENTION

First Embodiment

Figure 1:
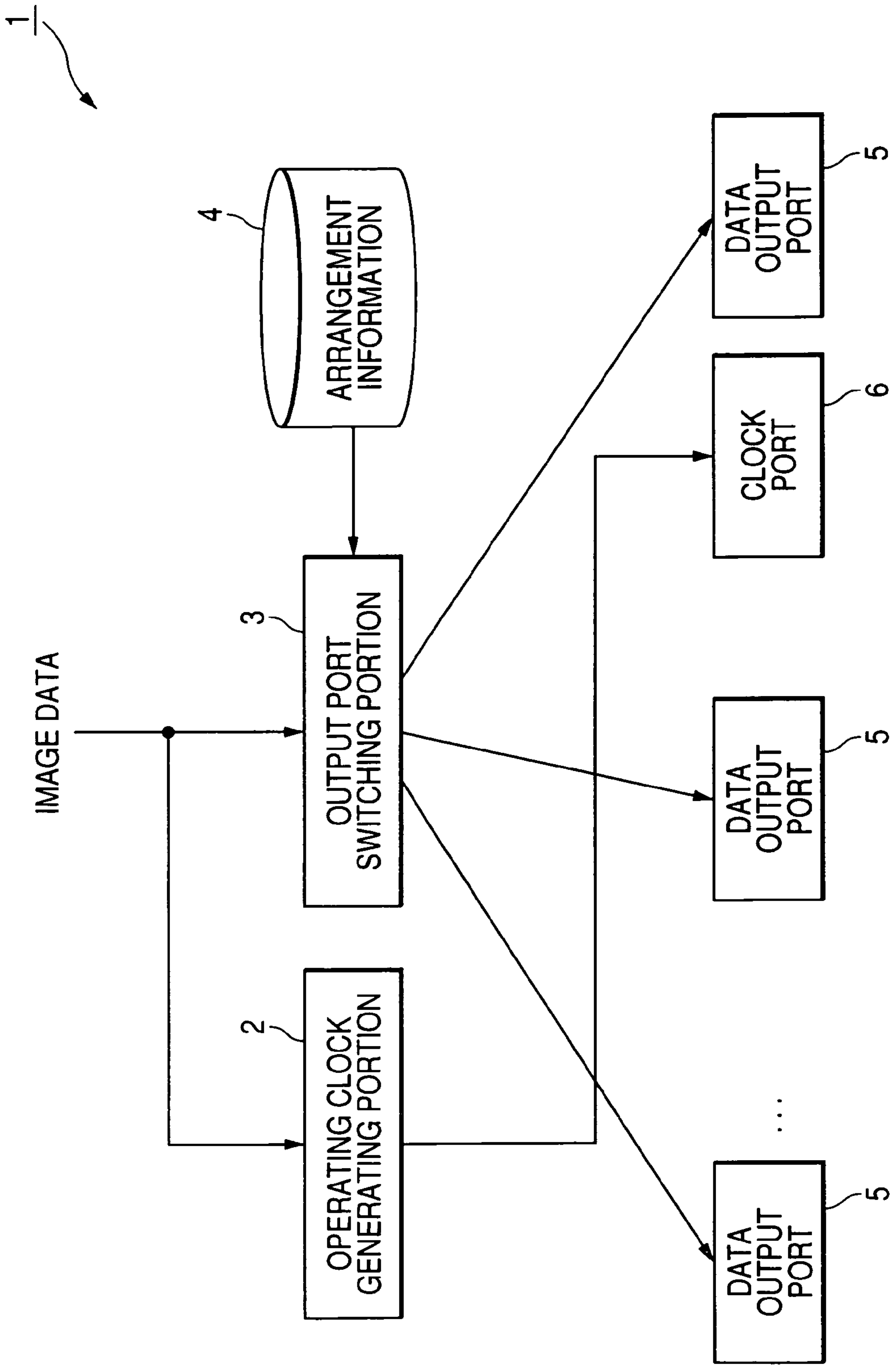
FIG. 1 is a block view illustrating an example of the detail of a primary portion of an image display apparatus according a first embodiment of the invention.

FIG. 1 is a block view illustrating an example of the detail of a primary portion of an image display apparatus according to a first embodiment of the invention and shows a timing controller 1 of the RSDS transmission type, which supplies image data to data output ports 5 according to arrangement information. The image display apparatus according to this embodiment is a liquid crystal display enabled to suppress increase in the area and the multilayering of circuit boards and to improve the quality of waveform of a signal representing image data transmitted from the timing controller 1 to source driver ICs.

This image display apparatus includes a timing controller 1 to generate an operating clock according to image data, a source driver IC to take in image data according to an operating clock, and a display panel to perform screen-displaying according to the image data supplied to a source line.

The timing controller 1 includes an operating clock generating portion 2, an output port switching portion 3, an arrangement information storing portion 4, plural data output ports 5 and a group of clock ports 6. The timing controller 1 performs control operations to thereby supply image data to the data output ports 5 and also supply operating clocks to the clock port 6. Incidentally, the timing controller 1 outputs a data strobe signal (also referred to as a latch pulse), a polarity decision signal, and a horizontal synchronization start pulse STH to each of the source driver ICs. Also, the timing controller 1 outputs an operating clock CLKV for vertical scanning, a vertical scanning start pulse STV, and vertical scanning enable signal OE to each of gate driver ICs. These control signals are generated according to image data.

The image data is represented by digitalized video signals that are inputted from a digital camera and a personal computer. Concretely, a video signal representing to each bit of digital data respectively corresponding to colors R, G, and B is transmitted. The operating clock is a control signal generated for designating timing, with which a source driver IC takes in image data, to the source driver IC.

The clock port 6 is an output port to output operating clocks. The operating clock generating portion 2 generates operating clocks according to image data and supplies the operating clocks to the clock port 6. The operating clocks are supplied to the source driver ICs through the clock port 6.

The data output ports 5 are output ports that respectively output image data to the source driver ICs and that are provided in such a way as to be respectively associated with the image data. In this embodiment, it is assumed that the operating clocks and the image data are transmitted in the form of differential signals, such as reduced swing differential signals generated by using RSDS (Reduced Swing Differential Signaling), and that the groups of data output ports 5 are arranged in such a manner as to be asymmetrical with respect to the clock port 6. Further, the operating clocks and the image data are transmitted in the form of P-differential signals and N-differential signals.

The arrangement information storing portion 4 is a nonvolatile memory, such as an EEPROM (Electrically Erasable and Programmable ROM), which rewritably stores arrangement information determining which of normal and reverse order of arrangement of image data supplied to the data output port 5 is employed. The output port switching portion 3 is a switching unit to determine the order of arrangement of image data according to this arrangement information and to switch the order of arrangement of image data to be supplied to each of the data output ports 5. That is, the order of arrangement of image data to be outputted from each of the data output ports 5 of the timing controller 1 can be switched between the normal order and the reverse order, as need arises, by rewriting the arrangement information.

Usually, the number of source driver ICs to be mounted is determined according to the number of output pins of each of the source driver ICs, from which image data is outputted to each of the source lines, and the resolution needed to perform screen-displaying on the display panel. The mounting position, at which the timing controller 1 is mounted, is determined according to this number of mounted source driver ICs.

Figure 2:
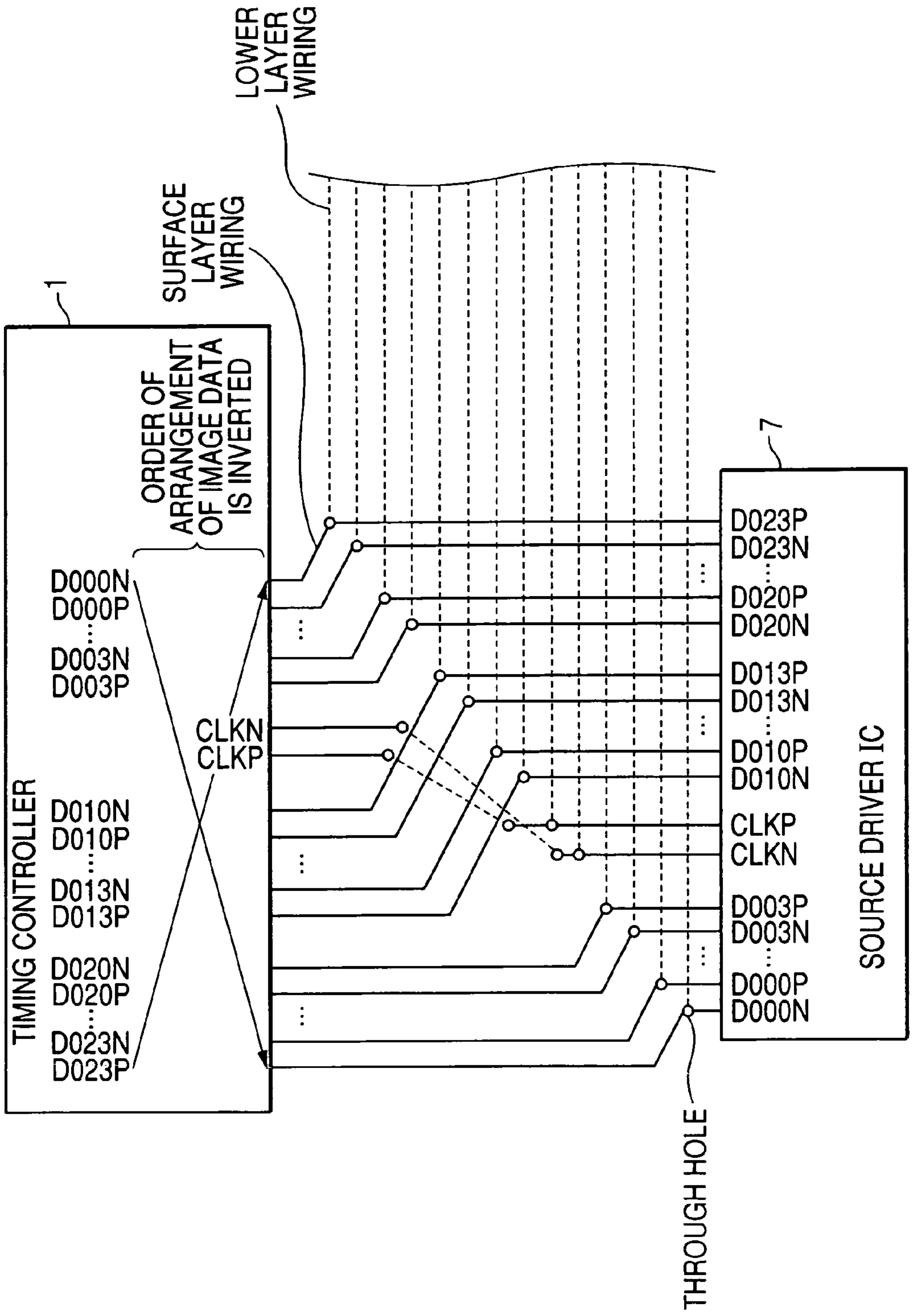
FIG. 2 is a block view illustrating the example of the detail of the primary portion of the image display apparatus according the first embodiment of the invention.

FIG. 2 is a block view illustrating the example of the detail of the primary portion of the image display apparatus according the first embodiment of the invention and shows the manner of wiring between the timing controller 1 and the source driver IC 7. The source driver IC 7 is provided with plural data input ports to take in image data, and a clock port to input operating clocks. Surface layer wirings extend from the data input ports and the clock port. The groups of data input ports are arranged in such a way as to be asymmetrical with respect to the clock port.

That is, the group of the data input ports, to which image data D000N to D003P are inputted, and the group of the data input ports, to which image data D010N to D013P and D020N to D023P are inputted, are disposed on either side of a group of clock ports CLKN and CLKP. Incidentally, the clock port of the source driver IC 7 is electrically connected to each of the data input ports, which is associated with one another among the source driver ICs, through the through hole and the lower layer wiring so as to prevent the wirings from being shortcircuited.

The order of arrangement of output ports of the timing controller 1 is the same as that of arrangement of input ports of the source driver IC 7. The timing controller 1 is disposed by being opposed to the source driver IC 7. In such a case, the order of arrangement of image data outputted from each of the data output ports 5 of the timing controller 1 can be inverted by rewriting the arrangement information held in the arrangement information storing portion 4.

Consequently, associated ports between the timing controller 1 and the source driver IC 7 can be connected to each other by the surface layer wiring without providing through holes in the board. Incidentally, when the associated clock ports are connected directly to each other by the surface layer wiring, this surface layer wiring intersects with another surface layer wiring. Thus, the associated clock ports are connected to each other by the lower layer wiring through the through hole.

In accordance with this embodiment, the order of arrangement of image data is determined according to the arrangement information. Then, the image data is supplied to each of the data output ports 5. Thus, the order of arrangement of image data to be outputted from each of the data output ports 5 of the timing controller 1 can be switched between the normal order and the reverse order, as need arises, by rewriting the arrangement information. Consequently, the timing controller 1 can be connected to the source driver IC 7 without newly providing through holes in the board.

Incidentally, although an example of the case of changing the order of arrangement of image data supplied to the data output ports 5 by rewriting the arrangement information held in the nonvolatile memory, such as an EEPROM, has been described in the foregoing description of this embodiment, the invention is not limited thereto. For example, the order of arrangement of image data may be changed by setting the pins.

Second Embodiment

The example of the case of switching the order of arrangement of image data, which is outputted from each of the data output ports 5 of the timing controller 1, between the normal order and the reverse order, as need arises, has been described in the description of the first embodiment. In contrast with this, in the following description of the second embodiment, an example of the case of providing two groups of clock ports, from which operating clocks are outputted, in the apparatus and of disposing the groups of clock ports at symmetrical positions, respectively, in the arrangement of the data output ports 5 is described hereinbelow.

Figure 3:
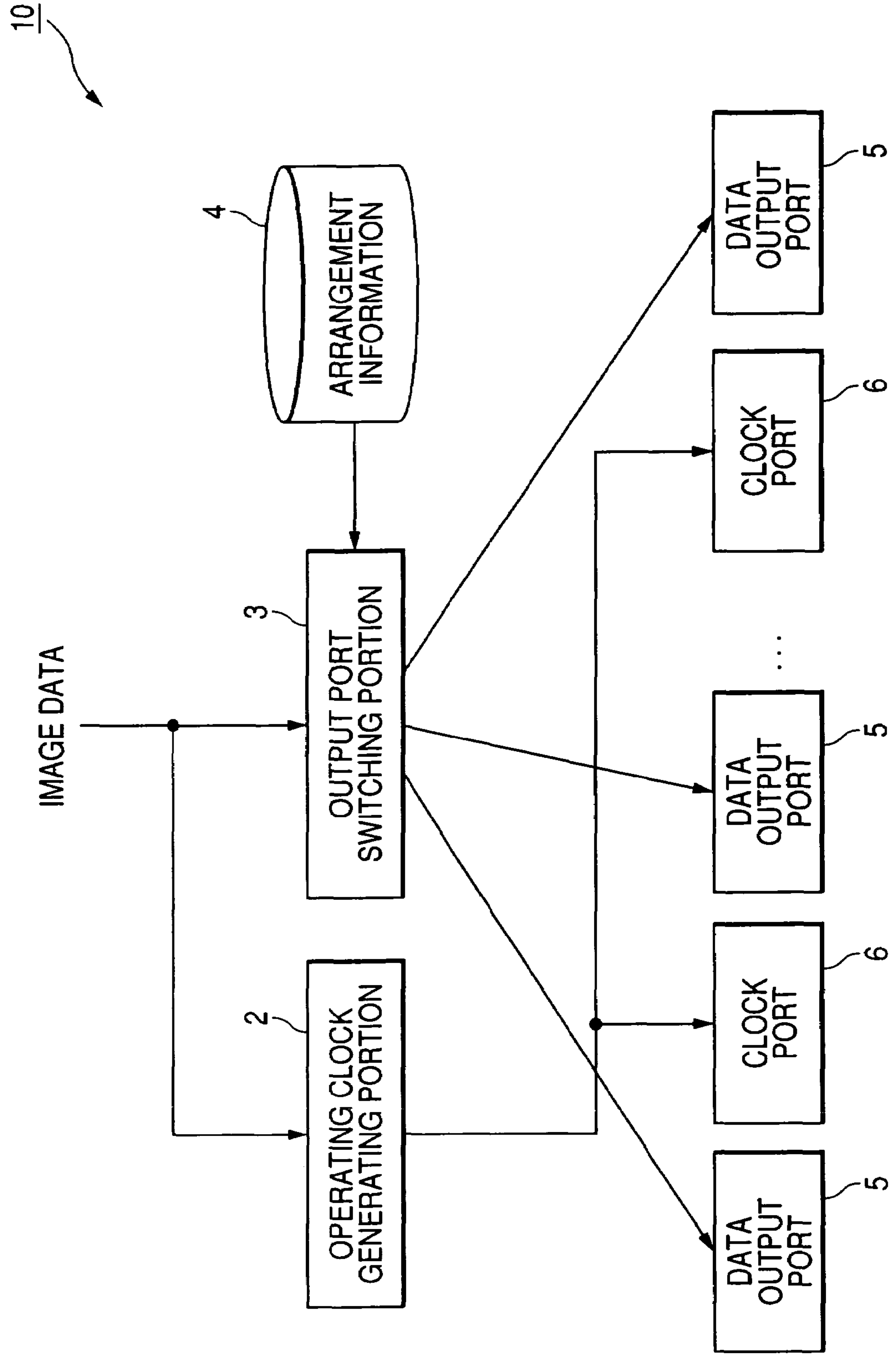
FIG. 3 is a block view illustrating an example of the detail of a primary portion of an image display apparatus according a second embodiment of the invention.

FIG. 3 is a block view illustrating an example of the detail of a primary portion of an image display apparatus according a second embodiment of the invention. A timing controller 10 according to this embodiment differs from the timing controller 1 (of the first embodiment) in that the timing controller 10 has two groups of clock ports 6, as compared with the timing controller 1 in FIG. 1.

The two groups of clock ports 6 are respectively provided at symmetrical positions in the arrangement of the data output ports 5. Each of the groups of clock ports 6 is constituted by a pair of output ports respectively associated with a p-differential signal and an n-differential signal. Regarding the order of the arrangement of the clock ports respectively associated with a p-differential signal and an n-differential signal, the two groups of clock ports 6 are symmetrical. That is, the order of arrangement of the clock ports respectively associated with a p-differential signal and an n-differential signal in one of the groups of clock pulses 6 is the reverse of the order of arrangement of the clock ports respectively associated with a p-differential signal and an n-differential signal in the other group of clock pulses 6. The operating clocks are supplied to the clock ports 6.

The output port switching portion 3 performs a control operation so that in a case of outputting operating clocks by using one of the groups of clock ports 6, image data are supplied to the data output ports 5 by inverting the order of arrangement of the image data, as compared with the case of outputting operating clocks by using the other group of clock ports 6.

Figure 4:
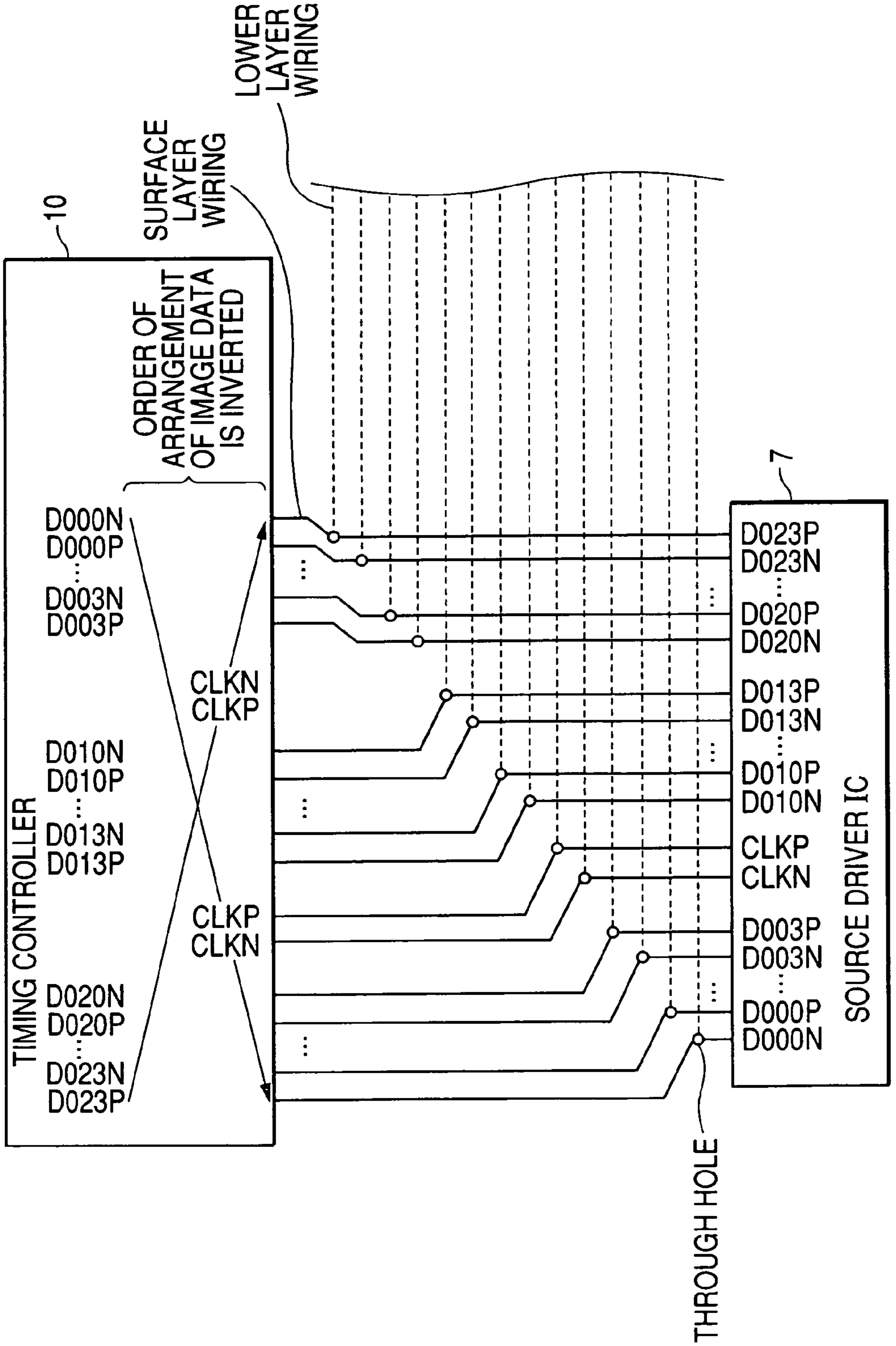
FIG. 4 is a block view illustrating an example of the detail of the primary portion of the image display apparatus according the second embodiment of the invention.

FIG. 4 is a block view illustrating an example of the detail of the primary portion of the image display apparatus according the second embodiment of the invention, and shows the manner of wiring between the timing controller 10 and the source driver IC 7. In a case where the order of arrangement of the output ports of the timing controller 10 is the same as that of arrangement of the input ports of the source driver IC 7, and where the timing controller 10 is disposed in such a manner as to be opposed to each of the source driver IC 7, the order of arrangement of image data outputted from the data output ports 5 of the timing controller 10 can be inverted by rewriting the arrangement information held in the arrangement information storing portion 4.

At that time, the associated ports can appropriately be connected to each other through the surface layer wiring between the timing controller 10 and the source driver IC 7 by selecting the clock port 6 from which the operating clocks are outputted. Incidentally, the unused clock ports 6 may be inhibited from operating. That is, the apparatus may be configured so that the clock ports 6 to supply operating clocks are alternatively selected in conjunction with the switching of the order of arrangement of image data, and that no clock pulses are supplied to the other clock ports 6. This prevents unnecessary waves from being radiated from the unused clock ports.

According to this embodiment, the groups of clock ports 6 are respectively placed at symmetrical positions in the arrangement of the data output ports 5. Even in the case where the image data and the operating clocks are transmitted in the form of differential signals generated by using RSDS, the timing controller can appropriately be connected to the driver IC at all times without newly providing through holes in the board. Therefore, the number of through holes formed in the board is reduced. Consequently, the increase in the area of the circuit board and the multilayering thereof can be suppressed. Moreover, the quality of waveform of a signal representing image data can be improved.

Also, the timing controller 10 can be always and properly connected to the source driver IC, regardless of the mounting position of the timing controller 10. Thus, as compared with the case of forming the timing controller according to the mounting position thereof, the manufacturing cost of the apparatus can be reduced.

Incidentally, each of the source driver ICs used in this embodiment is a semiconductor chip having plural input ports and plural output ports. Such source driver ICs are mounted on the board on which the display panel is formed. Image data and operating clocks are supplied from the timing controller 10 through the wiring provided on this board. Image signals are supplied from the output ports to source lines. The timing controller 10 of this embodiment can be mounted on the board by changing the order of arrangement of image data supplied to the data output ports 5 according to the mounting position thereof. Thus, the timing controller 10 can be always and appropriately connected to the source driver IC without changing the source driver IC. Therefore, common source driver ICs can be used as the source driver IC connected to the timing controller 10 and other source driver ICs. Consequently, the manufacturing cost of the apparatus can be reduced.

Incidentally, although the example of the case of supplying the image data and the operating clocks to each of the source driver ICs from the timing controller has been described in the description of this embodiment, the invention is not limited thereto. For example, the invention can be applied to an image display apparatus adapted to perform the transmission of image data and operating clocks to each of the source driver ICs by dividing the image data and the operating clocks into plural blocks (or by using plural channels). Also, the invention can be applied to an image display apparatus enabled to change the number of bits in a data transmission.

Third Embodiment

Although the example of the case of switching the order of arrangement of image data, which is supplied to each of the data output ports 5, in the timing controller 10, as need arises, has been described in the description of the second embodiment, the case of changing the order of arrangement of image data taken in through the data input ports of each of the source driver ICs, as need arises, is described in the following description of a third embodiment.

Figure 5:
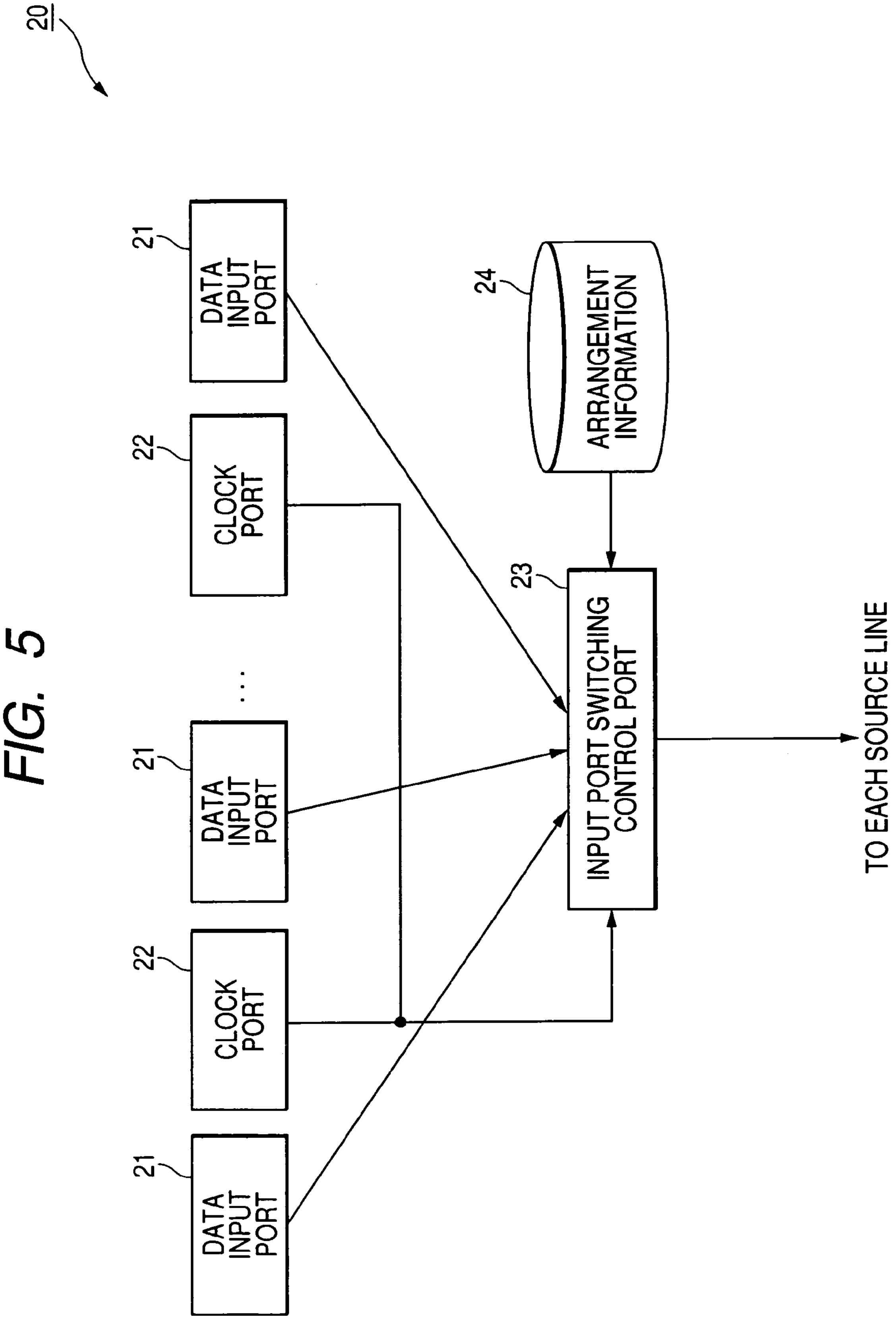
FIG. 5 is a block view illustrating an example of the detail of a primary portion of an image display apparatus according a third embodiment of the invention.

FIG. 5 is a block view illustrating an example of the detail of a primary portion of an image display apparatus according a third embodiment of the invention, and shows a source driver IC 20 of the RSDS transmission type that takes in image data according to arrangement information. The source driver IC 20 includes plural data input ports 21, two groups of clock ports 22, an input port switching control portion 23, and arrangement information storing portion 24. The two groups of clock ports 22 are respectively provided at symmetrical positions with respect to the arrangement of the data input ports 21.

The data input ports 21 ate input ports, to which image data is inputted from a timing controller. The input port switching control portion 23 determines the order of arrangement of image data according to arrangement information held in the arrangement information storing portion 24 and performs a control operation of switching the order of arrangement of image data taken in from each of the data input ports 21.

Figure 6:
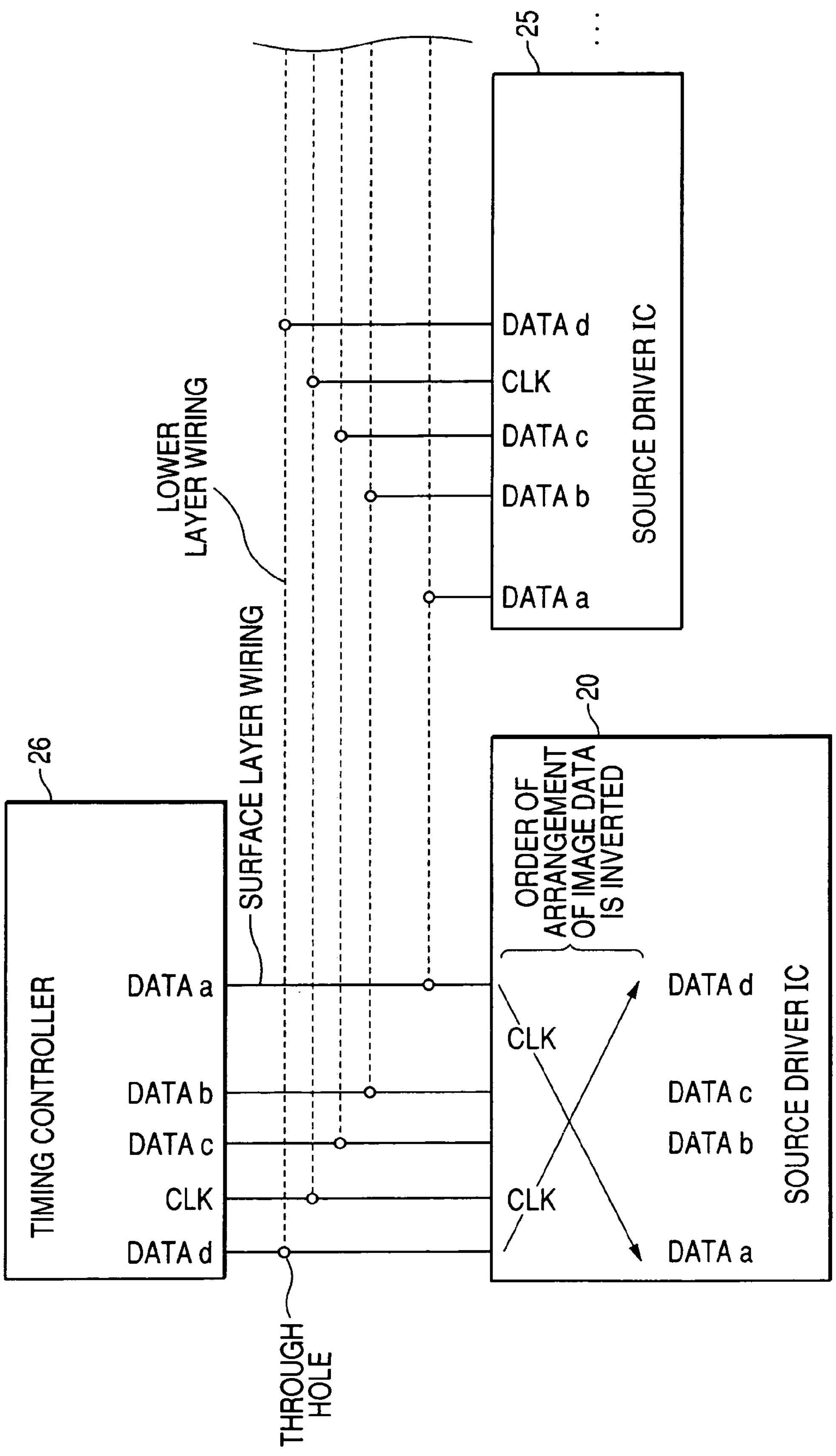
FIG. 6 is a block view illustrating the example of the detail of the primary portion of the image display apparatus according the third embodiment of the invention.
Figure 7:
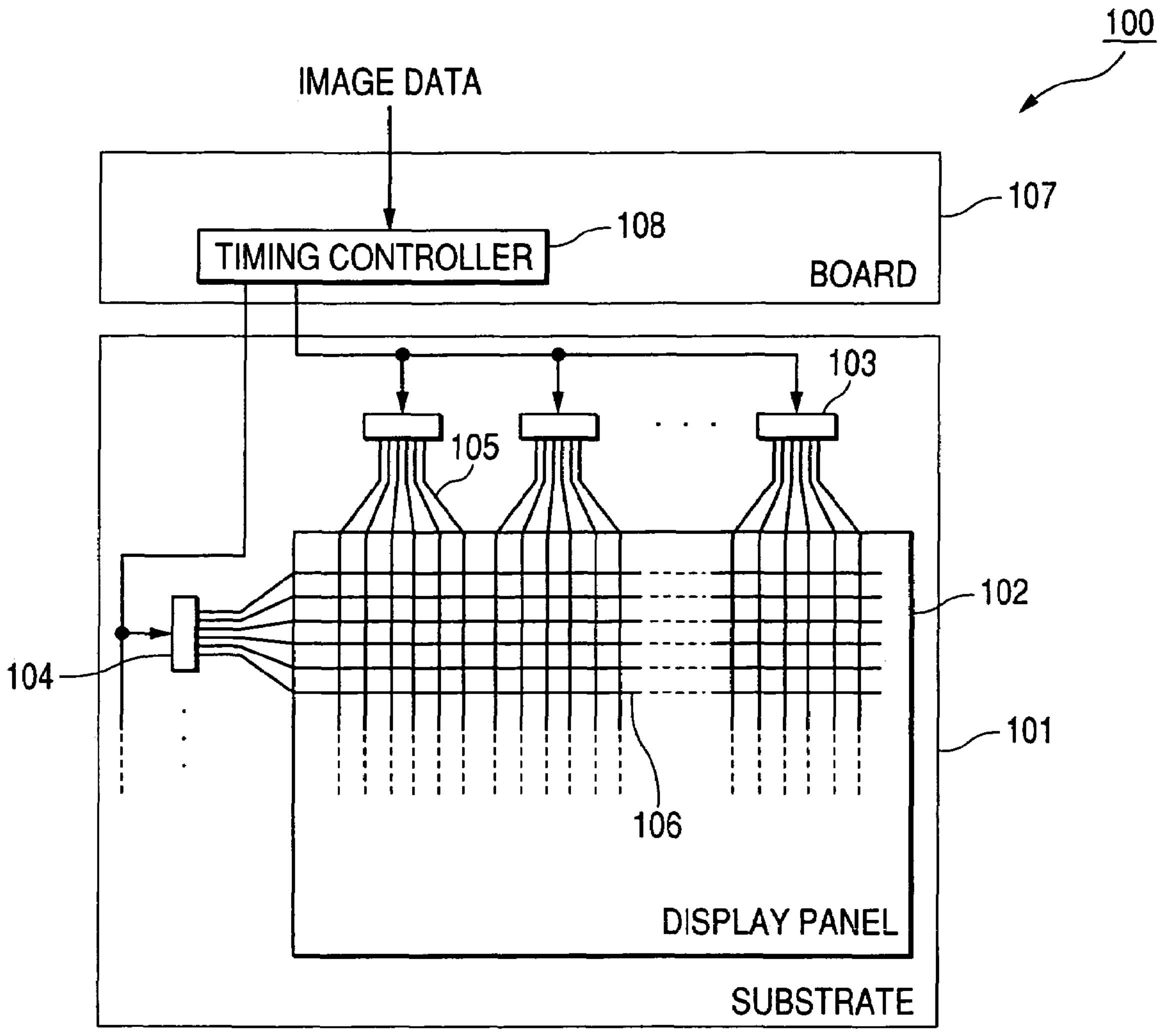
FIG. 7 RELATED ART
FIG. 7 is a schematic view showing the configuration of an image display apparatus.
Figure 8:
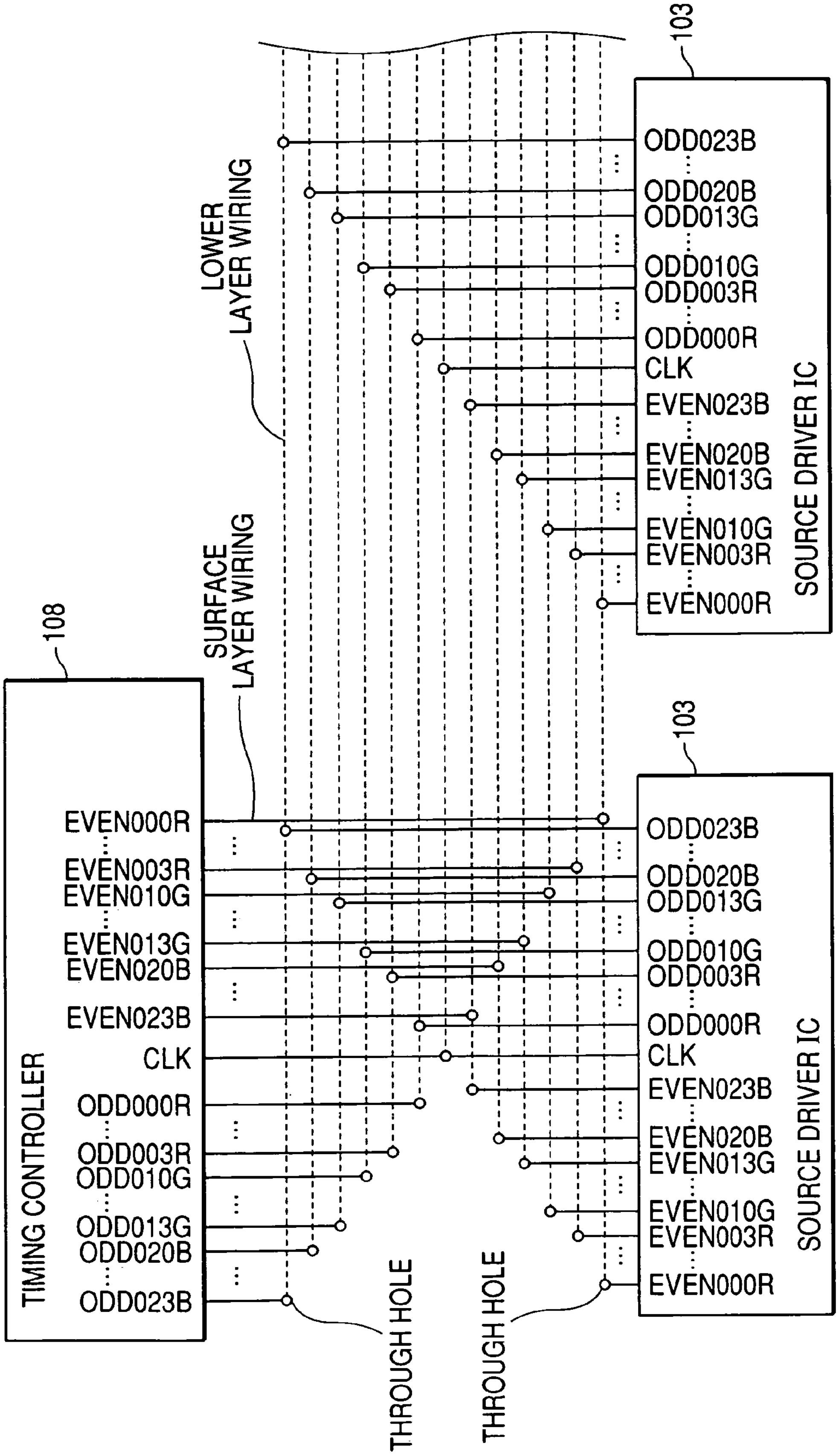
FIG. 8 RELATED ART
FIG. 8 is a view illustrating the details of a primary part of a conventional image display apparatus.
Figure 9:
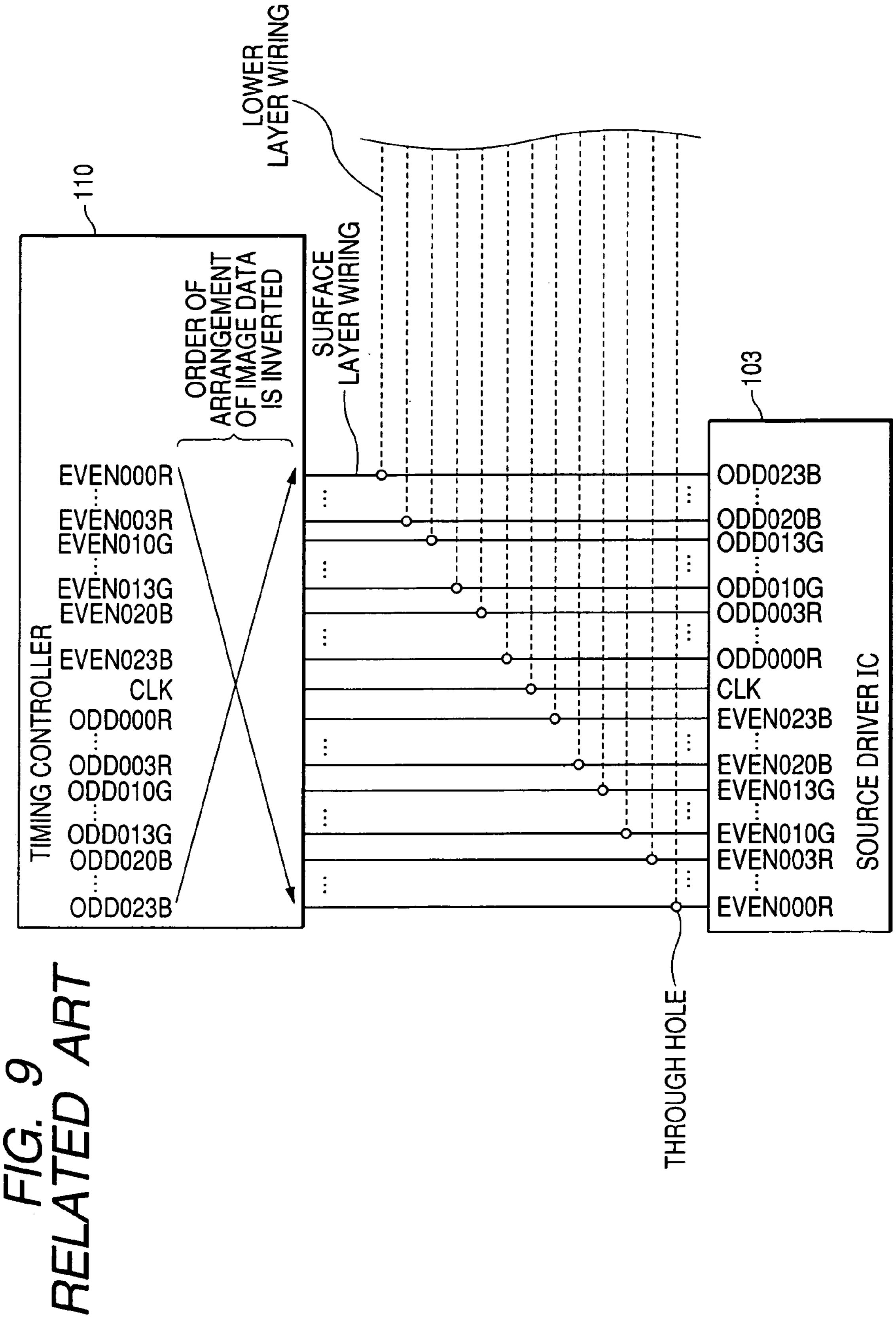
FIG. 9 RELATED ART
FIG. 9 is a view illustrating the details of a primary part of an image display apparatus.
Figure 10:
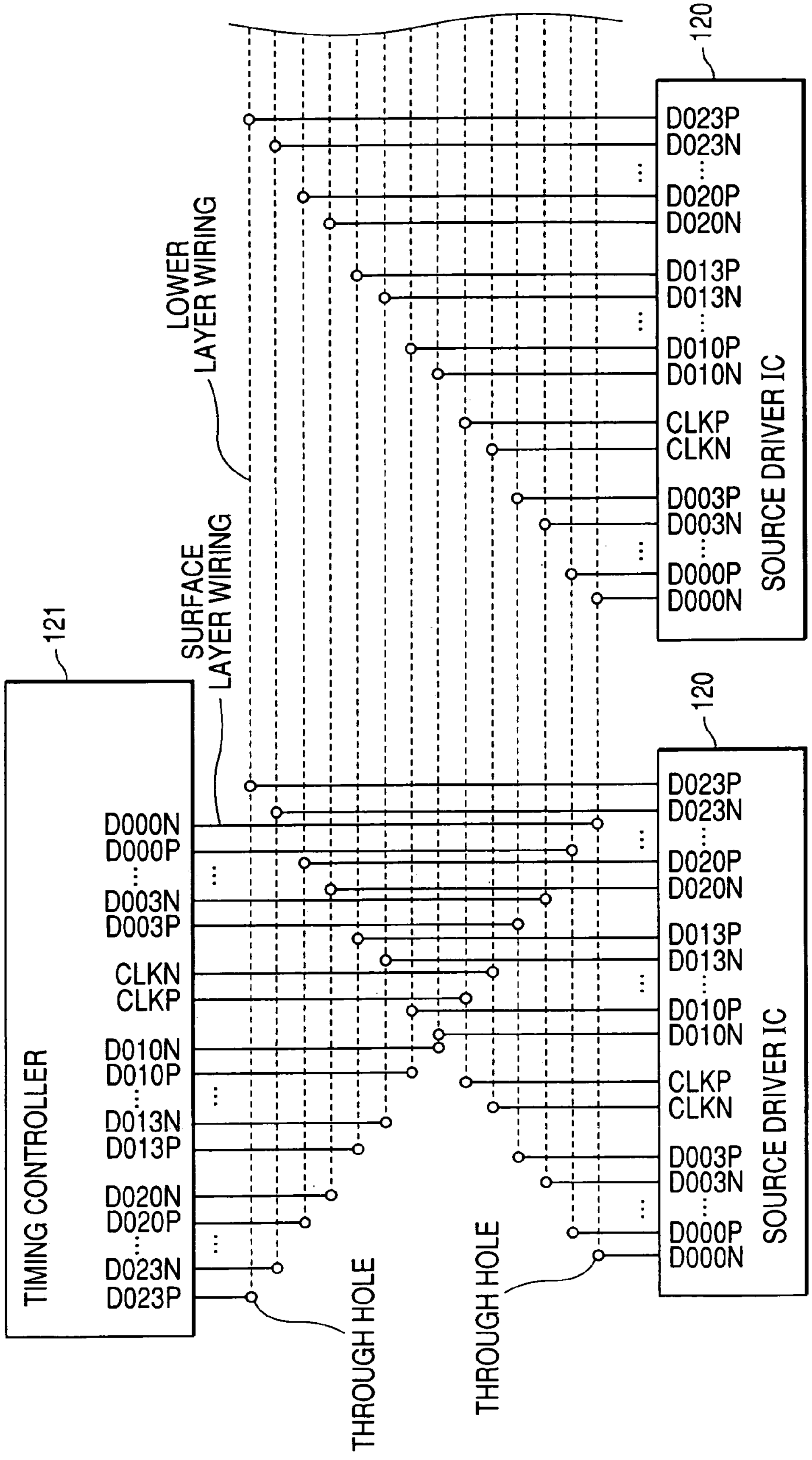
FIG. 10 RELATED ART
FIG. 10 is a view illustrating the details of a primary part of a conventional image display apparatus.

FIG. 6 is a block view illustrating the example of the detail of the primary portion of the image display apparatus according the third embodiment of the invention, and shows the manner of wiring among the timing controller 26 and the source driver ICs 20 and 25. The timing controller 26 is provided with plural data output ports and a clock port. Surface layer wiring extends from each of the data output ports and the clock port.

The data output ports are arranged in such a manner as to be asymmetrical with respect to the clock port. That is, the group of output ports, from which image data a to c are outputted, and that of output ports, from which image data d is outputted, are disposed on either side of a clock port CLK.

The order of arrangement of input ports of the source driver IC 20 is the same as that of arrangement of input ports of each of another source driver IC 25 and that of arrangement of output ports of the timing controller 26. The timing controller 26 is disposed in such a way as to be opposed to the source driver IC 20. In such a case, the order of arrangement of image data taken in through each of the data input ports 21 of the source driver IC 20 can be inverted by rewriting the arrangement information held in the arrangement information storing portion 24.

According to this embodiment, the order of arrangement of image data taken in through each of the data input ports 21 of the source driver IC 20 can be switched between the normal order and the reverse order by rewriting the arrangement information. Thus, the timing controller 26 and the source driver IC 20 can be connected without newly providing through holes in the board. Thus, increase in the area of the circuit board and the multilayering thereof can be suppressed. Also, the quality of waveform of a signal representing image data can be improved.

What is claimed is:

1. An image display apparatus comprising:

a timing controller to generate a control signal according to image data;

a driver IC to take in image data according to the control signal and to supply the image data to source lines; and a display panel to perform screen-displaying according to the image data supplied to the source lines, wherein a plurality of input ports of the driver IC, from which the image data are inputted, are arranged asymmetrically with respect to an input port for the control signal, and the timing controller includes:

a plurality of data output ports to output image data to the driver IC;

an arrangement information storing unit to store arrangement information defining normal and reverse orders of arrangement of image data supplied to the data output ports; and an output port switching unit to determine an order of arrangement of the image data according to the arrangement information and to supply the image data to the data output ports.

2. The image display apparatus according to claim 1, wherein the timing controller has two groups of clock ports from which an operating clock is outputted as an control signal, and the groups of clock ports are respectively disposed at symmetrical positions in an arrangement of the data output ports.

3. The image display apparatus according to claim 2, wherein when an operating clock is outputted by using one of the groups of clock ports, the output port switching unit supplies image data to each of the data output ports by inverting an order of arrangement of the image data, as compared with a case of outputting an operating clock by using the other of the group of clock ports.

4. The image display apparatus according to claim 2, wherein the image data and the operating clock are transmitted in a form of a differential signal.

5. An image display apparatus comprising:

a timing controller to generate a control signal according to image data;

a driver IC to take in image data according to the control signal and to supply the image data to source lines; and a display panel to perform screen-displaying according to the image data supplied to the source lines, wherein the driver IC includes:

a plurality of data input ports to which image data are inputted from the timing controller;

two groups of clock ports to which operating clocks are inputted;

an arrangement information storing unit to store arrangement information determining which of a normal order and a reverse order is employed as an order of arrangement of image data taken in through the data input ports; and an input port switching unit to determine the order of arrangement according to the arrangement information and to take in image data, and the groups of clock ports are respectively provided at symmetrical positions in an arrangement of the data input ports.

6. A timing controller for a driver IC, which generates an operating clock according to image data and outputs the operating clock to a driver IC to take in image data according to the operating clock, the timing controller comprising:

a plurality of data output ports to output image data to the driver IC;

two groups of clock ports from each of which an operating clock is outputted;

an arrangement information storing unit to store arrangement information defining normal and reverse orders of arrangement of image data supplied to the data output ports; and an output port switching unit to determine an order of arrangement of the image data according to the arrangement information and to supply the image data to the data output ports, wherein the groups of clock ports are respectively provided at symmetrical positions in an arrangement of the data output ports.

7. The timing controller for a driver IC according to claim 6, wherein when an operating clock is outputted by using one of the groups of clock ports, the output port switching unit supplies image data to each of the data output ports by inverting an order of arrangement of the image data, as compared with a case of outputting an operating clock by using the other of the group of clock ports.

8. The timing controller for a driver IC according to claim 6, wherein the image data and the operating clock are transmitted in a form of a differential signal.

9. A source driver IC to take in image data according to an operating clock, which is generated by a timing controller according to image data and to supply the image data to source lines, the source driver IC comprising:

a plurality of data input ports to which image data are inputted from the timing controller;

two groups of clock ports to which operating clocks are inputted;

an arrangement information storing unit to store arrangement information determining which of a normal order and a reverse order is employed as an order of arrangement of image data taken in through the data input ports; and an input port switching unit to determine an order of arrangement according to the arrangement information and to take in image data, wherein the groups of clock ports are respectively provided at symmetrical positions in an arrangement of the data input ports.

* * * * *